United States Patent [19]
Rodgers

[11] Patent Number: 5,792,363
[45] Date of Patent: Aug. 11, 1998

[54] METHOD FOR REMOVING SOLIDS FROM A CONTAMINATED LIQUID

[76] Inventor: William Rodgers, 12 Childs Road, Chipping Norton, New South Wales, 2170, Australia

[21] Appl. No.: 703,347

[22] Filed: Aug. 26, 1996

Related U.S. Application Data

[63] Continuation-in-part of Ser. No. 559,768, Nov. 15, 1995, abandoned, which is a continuation of Ser. No. 256,170, filed as PCT/AU93/00566, Nov. 1, 1993.

[30] Foreign Application Priority Data

Oct. 30, 1992 [AU] Australia ............... PL5589
Aug. 9, 1993 [AU] Australia ............... PM0424

[51] Int. Cl.$^6$ .................. B04C 3/00; B01D 21/26; B01D 21/01
[52] U.S. Cl. .................. 210/704; 210/723; 210/787; 210/808
[58] Field of Search ................. 210/702, 704, 210/723, 787, 788, 416.1, 808

[56] References Cited

U.S. PATENT DOCUMENTS

| | | | |
|---|---|---|---|
| 4,490,259 | 12/1984 | Coffing | 210/704 |
| 5,124,034 | 6/1992 | Maness | 210/195.3 |

*Primary Examiner*—David A. Reifsnyder
*Attorney, Agent, or Firm*—Edwin D. Schindler

[57] ABSTRACT

A method of removing suspended solids from contaminated liquid by the steps of passing the contaminated liquid after the addition of a flocculation agent and dissolved gas as a vortex flow through a tapered upwardly divergent conduit from a conduit entry end to a conduit outlet end. Trapping flocs at the outlet end of the conduit in a depressurised dischargeable chamber which extends into the conduit at the outlet end and is in communication with the liquid in the conduit and simultaneously discharging floc free liquid from a zone between the chamber and the conduit wall defining the conduit outlet end.

5 Claims, 1 Drawing Sheet

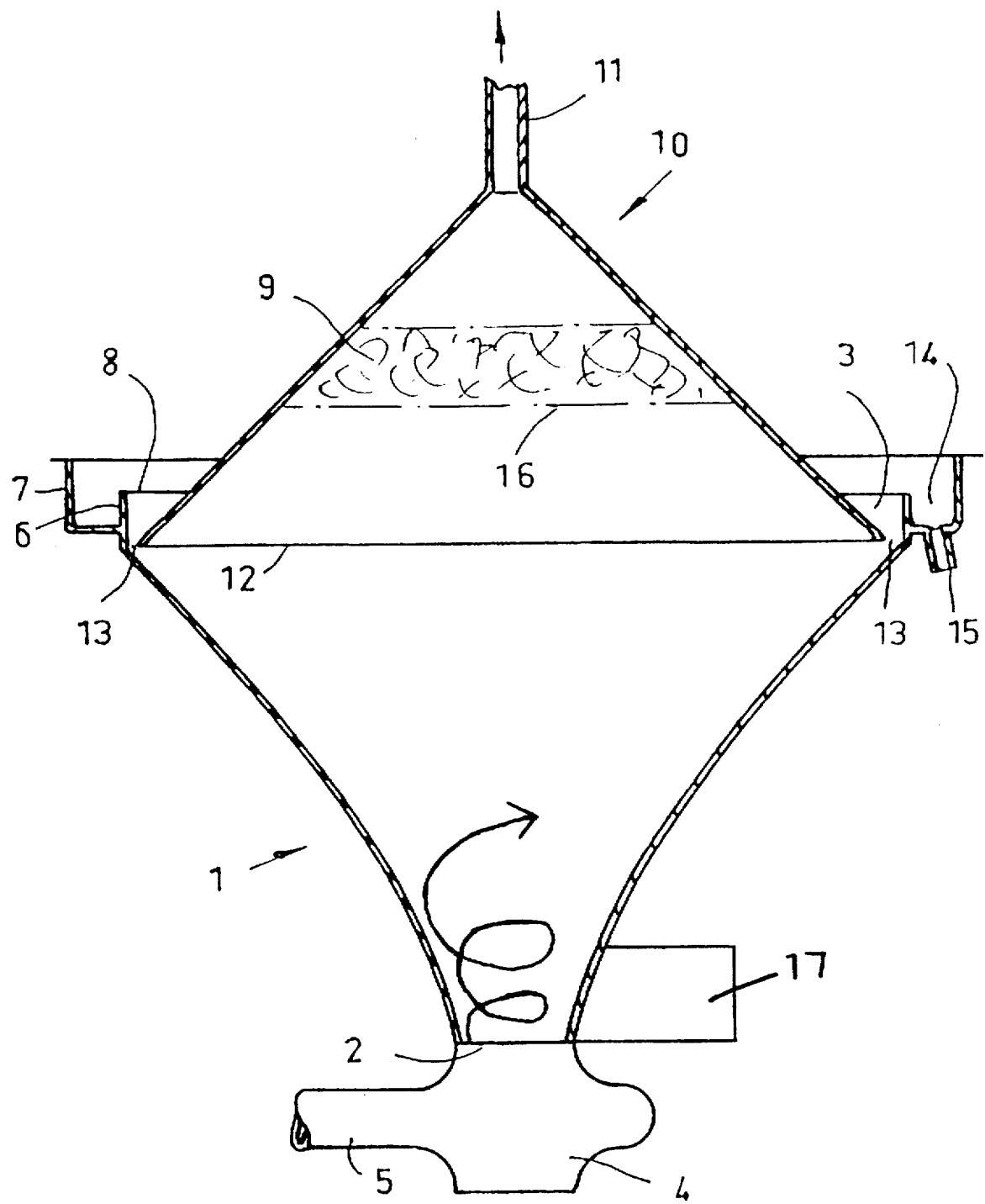

5,792,363

1

METHOD FOR REMOVING SOLIDS FROM A CONTAMINATED LIQUID

CROSS-REFERENCE TO RELATED APPLICATIONS

This is a continuation-in-part of application Ser. No. 08/559,768, filed Nov. 15,1995, now abandoned which is a continuation of application Ser. No. 08/256,170, filed Jun. 28,1994, now abandoned, which is a 35 U.S.C. §371 national phase application of PCT/AU93/00566, filed Nov. 1, 1993.

FIELD OF THE INVENTION

This invention relates to the removal of solids from a liquid in which they are suspended.

OBJECTS OF THE INVENTION

It is the primary objectives of the invention provide a method and an apparatus to remove suspended solids from a liquid by the creation and collection of flocs containing the solids.

BACKGROUND TO THE INVENTION

There are many instances where suspended solids need to be removed from liquids. Examples are, in drinking water supply systems, sewerage plants, in the treatment of mining tailings, and in the removal of heavy metals and phosphorous from liquids used in industrial or commercial processes.

Solid particles suspended in water, or other liquid, will float or sink at a velocity which is a function of the size of the particles, the specific gravity difference between the solids and the liquid and the viscosity of the liquid. The smaller the particles, the lower is the settling velocity, which effectively becomes zero for small "colloidal" particles. If the particles settle rapidly they can be separated from a liquid stream more readily.

The settling velocity can be increased by collecting the particles into "flocs" which are agglomerations of the particles. The flocs act as one composite particle and settle more rapidly than the particles making up the flocs would settle. The creation of flocs is conventionally promoted by adding chemicals to the liquid (either coagulants and/or flocculants) which act upon the electrical charges on the particles. The flocs grow by collision between particles in the fluid as it is agitated or mixed and the particles are held together after colliding by electrical attraction.

It is known to promote flocculation using a stirrer to disburse chemicals uniformly throughout the liquid. This is carried out rapidly using high velocity mixing. As such mixing inhibits the creation of large flocs the mixed flocs are passed through a series of chambers in which the mixing velocities are reduced so that larger flocs can grow without breaking. The larger flocs are passed to a settling basin. See for example U.S. Pat. No. 5,124,034 wherein the flocculated solids from the liquid flow settle to the bottom of a tank and are then removed. In some cases extended settling areas in the form of inclined plates or tubes are introduced into the settling tank to remove flocculated particles settling with lower velocities.

STATEMENTS OF THE INVENTION

The invention provides a method of removing suspended solids from contaminated liquid by the steps of passing the contaminated liquid after the addition of a flocculation agent and dissolved gas as a vortex flow through a tapered upwardly divergent conduit from a conduit entry end to a conduit outlet end, trapping flocs at the outlet end of the conduit in a depressurised dischargeable chamber which extends into the conduit at the outlet end and is in communication with the liquid in the conduit and simultaneously discharging floc free liquid from a zone between the chamber and the conduit wall defining the conduit outlet end.

The invention further provides apparatus for the carrying out of the above method where the apparatus includes a conduit of circular cross-section which increases in diameter from an entry end of the conduit to an outlet end of the conduit, means to induce a vortex flow in liquid passing through the conduit from the entry end to the outlet end, a floc collection chamber extending beyond the outlet end of the conduit and having a discharge port and an inlet end defined by a chamber wall portion which is disposed within the outlet end of the conduit and which lies adjacent the conduit wall to define a liquid discharge zone between the conduit wall and the collection chamber wall portion.

BRIEF DESCRIPTION OF THE DRAWING

The drawing Figure is a schematic side sectional view of an apparatus for carrying out the method of the invention.

DESCRIPTION OF THE INVENTION.

The apparatus illustrated comprises a conduit 1 which is of circular cross-section and tapers from its entry end 2 to its outlet end 3. The taper of the conduit is shown as being one defined by a curved conduit wall, it is to be noted that the curvature of the conduit wall is a preferred feature and is not essential for the operation of the apparatus. At the inlet end the conduit 1 is provided with a vortex promoting housing 4 with an inlet 5 for liquid with suspended solids delivered under pressure.

The outlet end 3 the conduit is provided with a cylindrical collar 6 around which there is a trough 14 defined by the wall 7. There top 8 of the collar 6 acts as a continuous weir over which discharged treated liquid will pass into the trough 14. The liquid will be discharged from the trough 14 through suitable outlets from the trough 14, indicated 15.

Mounted above the outlet end 3 of the conduit 1 there is a hood 10 which, in the operation of the apparatus, defines a floc collection chamber. The hood 10 is in the shape of a truncated cone, although a cross-section other than circular is possible particularly if the outlet end of the conduit is other than circular in shape. At the small end of the hood there is an outlet 11 adapted to be coupled to means to reduce the pressure inside the hood to below atmospheric during the operation the apparatus.

The hood 10 has a lower end portion 12 entered into the conduit 1 and positioned adjacent to and below the level of the top 8 of the collar 6 and is spaced from the collar 6 thereby to provide an annular discharge zone identified 13 for clean liquid.

In the performance of the method of the invention, contaminated liquid is delivered under pressure to the vortex promoting housing 4. A housing 4 including a vortex generating spiral flow path for the liquid is a preferred device, it is to be understood that alternative vortex flow promotion means may be used.

Solids containing liquid is treated prior to its vortex passage through the conduit by adding chemicals such as coagulants and flocculants, polyelectrolytes, for example, and gas either as fine bubbles or dissolved in the liquid as a supersaturated solution. The chemical additives promote the creation of flocs and the gas bubbles when attached to the flocs cause them to be become buoyant.

Coagulants such as aluminum or ferric chloride interact with the charged particles in colloidal suspensions which then allow the suspended solids together with metal hydroxides to form flocs. These flocs are gathered into larger more robust flocs by long chain polyelectrolyte molecules.

The gas, which may be air, is preferably added by dissolving it under pressure in a liquid stream connected to the housing 4 via an expansion valve. The pressure in this stream is reduced as it flows through the expansion valve to the pressure of the housing 4 and the gas comes out of solution as micro bubbles which form on the solid particles in the contaminated liquid as nuclei. The micro bubbles increase in size as more air comes out of solution and the flocs with the air bubbles attached rise to the surface of the liquid in the conduit to form a floating layer in the hood 10, as indicated 9.

It is to be understood that the additives may be added as a pre-treatment of the contaminated liquid, may be added to the liquid whilst passing through the housing 4, or in another possible arrangement be added at an early stage 16 of liquid passage through the conduit. As an example, the additives could be introduced to the liquid in association with an alternative vortex forming means, such as vanes on the inner wall of the conduit adjacent the entry end of the conduit. The manner of additive application and the manner of vortex flow can vary depending upon the liquid being treated.

It is also to be understood also that the additives may be varied, however floc forming chemicals (coagulants and/or flocculants) and fine gas bubbles either dissolved or dispersed are essential to the success of the method of the invention.

The method in its preferred form involves the use of a supersaturated liquid stream may be formed by dissolving a gas in a "clean" supplemental or treated effluent liquid at a pressure of several atmospheres with sufficient time and agitation to ensure that the supplemental liquid is nearly saturated with gas in solution, and then expanding this supplemental liquid stream back to the pressure of the contaminated stream so that the expanded liquid is now supersaturated with the gas which will come out of solution as micro bubbles with suspended particles as nuclei. The treated liquid stream containing small flocs of suspended solids with air bubbles attached to the flocs enters the conduit as a vortex flow which progresses upwards through the larger diameter sections of the conduit. During its upward movement the velocities and velocity gradients of the liquid decrease so that small flocs by colliding form larger flocs which, because they contain air bubbles, are buoyant and rise above the vortex stream lines they were following.

Due to the diversion of the contoured conduit wall from the entry end to the outlet end of the conduit the flocs move away from the contoured wall to leave a layer of clear liquid adjacent the contoured wall. The layer increases in thickness towards the outlet end of the conduit. As the centrifugal effects in the vortex flow are strongest at the bottom of the conduit and decrease in the passage of the liquid through the conduit the decrease in centrifugal acceleration combines with the gas supplied buoyancy to cause the flocs to rise away from the vortex stream lines and move radially inwards away from the contoured conduit wall. The floc size developed and the settling rate can be varied by increasing or decreasing the velocity gradients in the liquid and the equilibrium size of the flocs will increase as the velocity gradients decrease.

It is a requirement for the conduct of the method that the taper of the conduit is not such that the flow will leave the conduit wall and cause turbulence, as this will interfere with the uniform decrease of the velocity gradients as the liquid passes through the conduit.

The provision of a negative pressure in the collection chamber, created by connecting the outlet 11 to a suction pump or the like, results in the liquid level in the collection chamber rising to the level above that of the level of the top of the weir 8, as indicated 16. The floc layer 19 above the surface 16 is be drawn off by the suction pump.

The floc free liquid rising along the conduit walls will pass through the zone 13, over the top of the weir 8 and flow into the trough 14.

In a typical apparatus as used for primary sewerage treatment, the conduit would have an overall height in the order of 3 meters and it would have an outlet end with a diameter in the order of 3 meters. The throughput of the unit would be in the order of 20,000 liters of liquid per hour to which would be added in the order of 300 liters of air per hour. The additives would preferably be 50 milligrams of ferric chloride per litre of liquid and 2 milligrams of polyelectrolyte per liter. As will be understood these figures are given by way of example only and they may be varied as having contaminants of various types and concentrations.

I claim:

1. A method for producing a clean liquid from a liquid contaminated by suspended solids, said method comprising the steps of:

delivering contaminated liquid mixed with a flocculation agent and dissolved gas to a conduit having an entry end and an outlet end, said conduit tapers upwardly divergently from the entry end to the outlet end;

introducing a liquid contaminated by suspended solids into the entry end of said conduit as a vortex flow and passing the liquid through said conduit to the outlet end of said conduit, flocs forming in the liquid as it passes through said conduit;

trapping the flocs, at the outlet end of said conduit, in a chamber having an inlet immersed in the liquid in the conduit and an outlet spaced from the outlet end of said conduit for providing a substantially floc-free clean liquid at the outlet end of said conduit external to said chamber; and, withdrawing trapped flocs from within said chamber through the outlet of said chamber, while maintaining said chamber at a sub-atmospheric pressure.

2. A method for producing a clean liquid from a liquid contaminated by suspended solids, said method comprising the steps of:

treating a contaminated liquid contaminated by suspended solids by adding to the contaminated liquid, at least, one flocculation promotion agent and a dissolved gas;

passing the contaminated liquid, following said treating step, as a vortex flow from an inlet end of a conduit of circular cross-section, which continually increases in cross-sectional size towards an outlet end of said conduit, the vortex flow through said conduit promotes formation of buoyant gas containing flocs and movement of the flocs away from a wall defining said conduit and towards a central axis of said conduit for providing a substantially floc-free clean liquid adjacent the wall of said conduit;

providing a floc collection chamber which extends beyond the outlet end of said conduit and includes an inlet defined by a chamber wall portion which is disposed within the outlet end of said conduit and is immersed in the floc-free clean liquid in said conduit and which lies adjacent the wall of said conduit for defining a substantially annular liquid discharge zone for the substantially floc-free clean liquid between the wall of said conduit and the chamber wall portion of the floc collection chamber;

maintaining a sub-atmospheric pressure in the floc collection chamber for create a liquid level in the floc collection chamber higher than a liquid level in said conduit; and, drawing off the flocs from a surface of the liquid in the floc collection chamber.

3. The method for producing a clean liquid from a liquid contaminated by suspended solids according to claim 2, wherein the step of treating the contaminated liquid with a flocculation promotion agent and dissolved gas is performed before the liquid enters said conduit.

4. The method for producing a clean liquid from a liquid contaminated by suspended solids according to claim 2, wherein the step of treating the contaminated liquid with a flocculation promotion agent and dissolved gas is performed after the liquid enters said conduit and adjacent to the inlet end of said conduit.

5. The method for producing a clean liquid from a liquid contaminated by suspended solids according to claim 2, wherein the dissolved gas is introduced into the contaminated liquid as a liquid additive supersaturated with a dissolved gas.

* * * * *